US012299666B2

(12) United States Patent
Murray

(10) Patent No.: US 12,299,666 B2
(45) Date of Patent: May 13, 2025

(54) SYSTEMS, METHODS AND DEVICES FOR BLUETOOTH NUMERIC COMPARISON PAIRING

(71) Applicant: VeriFone, Inc., Wilmington, DE (US)

(72) Inventor: James Murray, Dublin (IE)

(73) Assignee: VeriFone, Inc., Wilmington, DE (US)

(*) Notice: Subject to any disclaimer, the term of this patent is extended or adjusted under 35 U.S.C. 154(b) by 272 days.

(21) Appl. No.: 17/905,123

(22) PCT Filed: Mar. 1, 2021

(86) PCT No.: PCT/US2021/020339
§ 371 (c)(1),
(2) Date: Aug. 26, 2022

(87) PCT Pub. No.: WO2021/174213
PCT Pub. Date: Sep. 2, 2021

(65) Prior Publication Data
US 2023/0140459 A1 May 4, 2023

Related U.S. Application Data

(60) Provisional application No. 62/983,124, filed on Feb. 28, 2020.

(51) Int. Cl.
*H04W 12/50* (2021.01)
*G06Q 20/20* (2012.01)
(Continued)

(52) U.S. Cl.
CPC ......... *G06Q 20/327* (2013.01); *G06Q 20/202* (2013.01); *H04B 10/116* (2013.01); *H04W 76/10* (2018.02); *H04W 84/18* (2013.01)

(58) Field of Classification Search
CPC .. G06Q 20/327; G06Q 20/202; H04B 10/116; H04W 76/10; H04W 84/18;
(Continued)

(56) References Cited

U.S. PATENT DOCUMENTS 9,123,042 B2 * 9/2015 von Mueller ...... G06Q 20/3823
10,187,362 B1 * 1/2019 Mcclintock ......... H04L 63/0272
(Continued)

FOREIGN PATENT DOCUMENTS

EP 3109786 A2 12/2016
WO 2017161285 A1 9/2017

OTHER PUBLICATIONS

European Search Report, European Application No. 21761248.0, pp. 1-10, dated Jan. 25, 2024.
(Continued)

*Primary Examiner* — Cindy Trandai
(74) *Attorney, Agent, or Firm* — Bond, Schoeneck & King, PLLC

(57) ABSTRACT

Systems, methods, and devices for Bluetooth numeric comparison pairing between a handheld payment terminal and a base station that is incapable of displaying digits of a base station Bluetooth pairing code are disclosed. A handheld payment terminal computer program may initiate Bluetooth numeric pairing with a base station; generate a handheld payment terminal Bluetooth pairing code; capture a coded light sequence emitted by LEDs on the base station; decode the coded light sequence to determine the base station Bluetooth pairing code; cause the base station Bluetooth pairing code and the handheld payment terminal Bluetooth pairing code to be displayed on a display; and in response to Bluetooth pairing code match, pairing the handheld payment terminal with the base station. The base station provides access to one or more networks and/or data communication to the handheld payment terminal when paired.

6 Claims, 5 Drawing Sheets

(51) Int. Cl.
*G06Q 20/32* (2012.01)
*H04B 10/116* (2013.01)
*H04W 76/10* (2018.01)
*H04W 84/18* (2009.01)

(58) Field of Classification Search
CPC ... H04W 12/50; H04W 76/14; H04W 12/084; H04W 12/47; H04W 4/80; H04L 61/00; H04L 2101/622
See application file for complete search history.

(56) References Cited

U.S. PATENT DOCUMENTS

| | | | |
|---|---|---|---|
| 11,871,237 B1* | 1/2024 | Han | H04W 92/10 |
| 2010/0005294 A1 | 1/2010 | Kostiainen et al. | |
| 2010/0112979 A1* | 5/2010 | Chen | H04W 12/50 |
| | | | 455/411 |
| 2011/0217950 A1 | 9/2011 | Kozlay | |
| 2012/0223883 A1* | 9/2012 | Solomon | G06F 3/0304 |
| | | | 345/157 |
| 2013/0182845 A1* | 7/2013 | Monica | H04L 63/0869 |
| | | | 380/270 |
| 2013/0254050 A1 | 9/2013 | Zhu et al. | |
| 2015/0095933 A1* | 4/2015 | Blackburn | H04N 21/64322 |
| | | | 725/25 |
| 2015/0098706 A1* | 4/2015 | Narendra | H04B 10/1143 |
| | | | 398/115 |
| 2016/0247138 A1 | 8/2016 | Wallner | |
| 2017/0004475 A1 | 1/2017 | White et al. | |
| 2017/0099568 A1 | 4/2017 | Rotsaert | |
| 2018/0063710 A1* | 3/2018 | Chen | G06F 21/43 |
| 2018/0091303 A1 | 3/2018 | Brook et al. | |
| 2018/0336332 A1 | 11/2018 | Singh et al. | |
| 2019/0124501 A1* | 4/2019 | Paradells Aspas | H04W 76/10 |
| 2020/0084511 A1* | 3/2020 | Kasarabada | H04N 21/4135 |
| 2020/0193408 A1* | 6/2020 | Hadley | G06Q 20/385 |
| 2020/0196136 A1* | 6/2020 | Shelton | G06F 21/445 |

OTHER PUBLICATIONS

Mikhail Fomichev et al: "Survey and Systematization of Secure Device Pairing", arxiv.org, Cornell University Library, 201 Olin Library Cornell University Ithaca, NY 14853, Sep. 8, 2017 (Sep. 8, 2017), XP080819557, DOI: 10.1109/COMST.2017.2748278.
Communication Pursuant to Rules 70(2) and 70A(2) EPC, European Application No. 21761248.0, p. 1, dated Feb. 13, 2024.
International Preliminary Report on Patentability, PCT Application No. PCT/US2021/020339, pp. 1-6, dated Aug. 30, 2022.
International Search Report and the Written Opinion of the International Searching Authority, PCT Application No. PCT/US2021/020339, pp. 1-8, dated May 18, 2021.
Communication Pursuant To Article 94(3) EPC, EP Patent Application No. 21761248.0, dated Jan. 20, 2025, pp. 1-9.
Kumar A et al.: "A comparative study of secure device pairing methods", Pervasive and Mobile Computing, Elsevier, Nl, vol. 5, No. 6, Dec. 1, 2009 (Dec. 1, 2009), pp. 734-749, XP026772140, ISSN: 1574-1192, DOI: 10.1016/J.PMCJ.2009.07.008.

* cited by examiner

SYSTEMS, METHODS AND DEVICES FOR BLUETOOTH NUMERIC COMPARISON PAIRING

CROSS-REFERENCE TO RELATED APPLICATIONS

The present application is a United States National Stage Application pursuant to 35 U.S.C. § 371 of International Patent Application No. PCT/US2021/020339, filed Mar. 1, 2021, which claims priority to U.S. Provisional Patent Application No. 62/983,124, filed Feb. 28, 2020, entitled, "Systems, Methods and Devices for Bluetooth Numeric Comparison Pairing", the disclosures of which are hereby incorporated by reference in their entireties.

BACKGROUND OF THE INVENTION

1. Field of the Invention

The present disclosure relates generally to systems, methods, and devices for Bluetooth numeric comparison pairing between two devices, such as a handheld payment terminal and a base station.

2. Description of the Related Art

It is common to pair two electronic devices using Bluetooth to, for example, enable data sharing between the devices, etc. The Bluetooth Core Specification, Version 5.2, available from Bluetooth SIG, Inc. (the "Bluetooth Specification") describes four main methods for Bluetooth pairing: (1) numeric comparison pairing; (2) passkey pairing; (3) out-of-band pairing; and (4) "just works" pairing. The details and advantages/disadvantages for each of these pairing methods is detailed in the Bluetooth Specification. The disclosure of the Bluetooth Specification is hereby incorporated by reference, in its entirety.

With the numeric comparison pairing method, during pairing, both electronic devices display a Bluetooth pairing code (e.g., a six-digit number), and the user confirms that both numbers match before pairing is complete. Numeric comparison pairing provides confirmation to the user that the correct devices are connected to each other and provides protection against man in the middle attacks because the user confirms that the Bluetooth pairing codes are the same and confirms this on both devices, With the passkey pairing method, at least one of the electronic devices must have an input device (e.g., a keypad) that allows the user to enter a six-digit passkey displayed by the other device. Alternatively, if neither electronic device has a display, both electronic devices must have a keypad, and the user may enter the same six-digit passkey into both devices.

With the out-of-band pairing method, a separate, non-Bluetooth, connection/channel is established between the two electronic devices, and during pairing, a secret is shared between the two devices using this channel, and pairing is completed.

With the "just works" pairing method, at least one of the electronic devices does not have a display capable of displaying a six-digit number, nor does it have a keyboard for entering six digits. Instead, the user may just accept the pairing without any numeric comparison.

SUMMARY OF THE INVENTION

Systems, methods, and devices for Bluetooth numeric comparison pairing between two devices, such as a handheld payment terminal and a base station, are disclosed. In one embodiment, a method for Bluetooth numeric comparison pairing may include: (1) initiating, by a handheld payment terminal computer program executed by a handheld payment terminal comprising at least one computer processor, Bluetooth numeric pairing with a base station using a Bluetooth radio on the handheld payment terminal; (2) generating, by the handheld payment terminal computer program, a handheld payment terminal Bluetooth pairing code; (3) capturing, by an image capture device on the handheld payment terminal, a coded light sequence emitted by one or more light emitting diodes (LEDs) on the base station, wherein the base station is incapable of displaying digits of a base station Bluetooth pairing code; (4) decoding, by the handheld payment terminal computer program, the coded light sequence to determine the base station Bluetooth pairing code; (5) causing, by the handheld payment terminal computer program, the base station Bluetooth pairing code and the handheld payment terminal Bluetooth pairing code to be displayed on a display of the handheld payment terminal; and (6) in response to an entry indicating that the base station Bluetooth pairing code and the handheld payment terminal Bluetooth pairing code match, the handheld payment terminal computer program pairing the handheld payment terminal with the base station, wherein the base station is configured to provide access to one or more networks and/or data communication to the handheld payment terminal when paired.

In one embodiment, the coded light sequence may include an encoded representation of the base station Bluetooth pairing code.

In one embodiment, the step of decoding, by the handheld payment terminal computer program, the coded light sequence to determine the base station Bluetooth pairing code comprises: identifying, by the handheld payment terminal computer program, a start sequence in the coded light sequence; identifying, by the handheld payment terminal computer program, the encoded representation of the base station Bluetooth pairing code following the start sequence; decoding, by the handheld payment terminal computer program and using a coding scheme, the encoded representation of the base station Bluetooth pairing code; and converting, by the handheld payment terminal computer program, the decoded representation of the base station Bluetooth pairing code into a base 10 number, wherein the base 10 number is the base station Bluetooth pairing code.

In one embodiment, the coded light sequence may include a plurality of concatenated binary numbers, each concatenated binary number representing a digit in the base station Bluetooth pairing code, and the step of decoding, by the handheld payment terminal computer program, the coded light sequence to determine the base station Bluetooth pairing code may include: identifying, by the handheld payment terminal computer program, a start sequence in the coded light sequence; identifying, by the handheld payment terminal computer program, the binary number for each digit in the base station Bluetooth pairing code following the start sequence; converting, by the handheld payment terminal computer program, each binary number into a base 10 number; and concatenating, by the handheld payment terminal computer program, the base 10 numbers, wherein the concatenated base 10 numbers is the base station Bluetooth pairing code.

In one embodiment, the LED being on may represent a binary "1" and the LED being off may represent a binary "0".

In one embodiment, the method may further include the handheld payment terminal computer program causing the display to display a prompt to enter a match or no match to a human input interface on the base station.

In one embodiment, at least one of the one or more networks comprises a payment network.

According to another embodiment, a base station electronic device may include a memory comprising a base station computer program; a human input interface; a Bluetooth radio; one or more light emitting diodes (LEDs); at least one network connection; a cradle for removably receiving a handheld payment terminal; and a computer processor configured to execute the base station computer program. The base station computer program may be configured to: receive, via the Bluetooth radio, a request to initiate Bluetooth numeric pairing with a handheld payment terminal; generate a base station Bluetooth pairing code, wherein the base station is incapable of displaying digits of a base station Bluetooth pairing code; generate a representation of the base station Bluetooth pairing code; cause the one or more LEDs to emit the representation of the base station Bluetooth pairing code as a coded light sequence; receive an indication that the base station Bluetooth pairing code matches or does not match a handheld payment terminal Bluetooth pairing code from the human input interface; in response to the indication of a match, pair the base station with the handheld payment terminal; and provide, via the Bluetooth radio, a network connection to the handheld payment terminal using the at least one network connection when paired.

In one embodiment, human input interface may include a button, and the indication may include a long press on the button or a short press on the button.

In one embodiment, the base station computer program may generate a representation of the base station Bluetooth pairing code by converting the base station Bluetooth pairing code into the representation of the base station Bluetooth pairing code, and may encoding the representation of the base station Bluetooth pairing code using a coding scheme.

In one embodiment, the base station computer program may generate a representation of the base station Bluetooth pairing code by converting each digit in the base station Bluetooth pairing code into a binary value and concatenating the binary values into the representation of the base station Bluetooth pairing code.

In one embodiment, one or more of the LEDs may emit the representation of the base station Bluetooth pairing code as the coded light sequence by turning on in response to a 1 in the representation of the base station Bluetooth pairing code and turning off in response to a 0 in the representation of the base station Bluetooth pairing code.

In one embodiment, the network connection may include a network connection to a payment network.

In one embodiment, the base station may be configured to charge the handheld payment terminal when the handheld payment terminal is removably received in the cradle.

According to another embodiment, a system for Bluetooth numeric comparison pairing a handheld payment terminal with a base station using an electronic device. The base station may be configured to: receive a request to initiate Bluetooth numeric pairing with a handheld payment terminal using a Bluetooth radio; generate a base station Bluetooth pairing code, wherein the base station is incapable of displaying digits of a base station Bluetooth pairing code; encode the base station Bluetooth pairing code according to a coding scheme; cause one or more light emitting diodes (LEDs) on the base station to emit the encoded base station Bluetooth pairing code as a coded light sequence; receive, from a human input interface, an indication that the base station Bluetooth pairing code matches a handheld payment terminal Bluetooth pairing code; in response to the indication, pair with the handheld payment terminal; and provide, via the Bluetooth radio, a network connection to the handheld payment terminal using at least one network connection when paired. The handheld payment terminal may be configured to: initiate Bluetooth numeric pairing with a base station using a Bluetooth radio on the handheld payment terminal; generate a handheld payment terminal Bluetooth pairing code; cause the handheld payment terminal Bluetooth pairing code to be displayed on a display of the handheld payment terminal; and pair with the base station. The electronic device may be configured to: capture the coded light sequence from the one or more LEDs on the base station using an electronic device image capture device; decode the coded light sequence to determine the base station Bluetooth pairing code; receive the handheld payment terminal Bluetooth pairing code from the handheld payment terminal; compare the base station Bluetooth pairing code and the handheld payment terminal Bluetooth pairing code; cause the display of the electronic device to display a result of the comparison; and cause the display of the electronic device to display a prompt to enter a match or no match on the base station and/or the handheld payment terminal.

In one embodiment, the coded light sequence may include an encoded representation of the base station Bluetooth pairing code.

In one embodiment, the electronic device may receive the handheld payment terminal Bluetooth pairing code from the handheld payment terminal by capturing a second coded light sequence from one or more LEDs on the handheld payment terminal using the electronic device image capture device and decoding the second coded light sequence to determine the handheld payment terminal Bluetooth pairing code.

In one embodiment, handheld payment terminal may be further configured to cause digits of the handheld payment terminal Bluetooth pairing code to be displayed on the display of the handheld payment terminal.

In one embodiment, the electronic device may receive the handheld payment terminal Bluetooth pairing code from the handheld payment terminal by receiving an image comprising the digits of the handheld payment terminal Bluetooth pairing code displayed on the display of the handheld payment terminal captured using the electronic device image capture device.

In one embodiment, the network connection comprises a network connection to a payment network.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are directed to systems, methods, and devices for Bluetooth numeric comparison pairing between a handheld payment terminal and a base station where the base station does not have a display that is capable of displaying the digits of a Bluetooth pairing code. In one embodiment, it may not be desirable to display the digits of the numeric Bluetooth pairing code on the display even if there is a display associated with the base station 130 because it may encourage man-in-the-middle attacks. Bluetooth pairing via numeric comparison in these situations may thus be challenging. Other pairing techniques may be expensive to implement or lack a sufficient level of security required to pair the payment terminal to a base station where sensitive personal information is often exchanged. For instance, a handled payment terminal without data network connectivity may need to transmit customer payment information and/or other personal information to the base station to effectuate the transaction. Without a secure connection between the handheld payment terminal and the base station, payment transactions may be compromised.

Although the disclosure may be made in the context of pairing a handheld payment terminal and a base station, it should be recognized that any two suitable electronic devices may be paired. For example, embodiments may be used in pairing any two electronic devices where, instead of a screen or a display that can display a numeric Bluetooth pairing code, one of the devices has one or more light emitting diodes ("LEDs") and a button or other input capable of receiving two inputs (e.g., match/no match).

Figure 1:
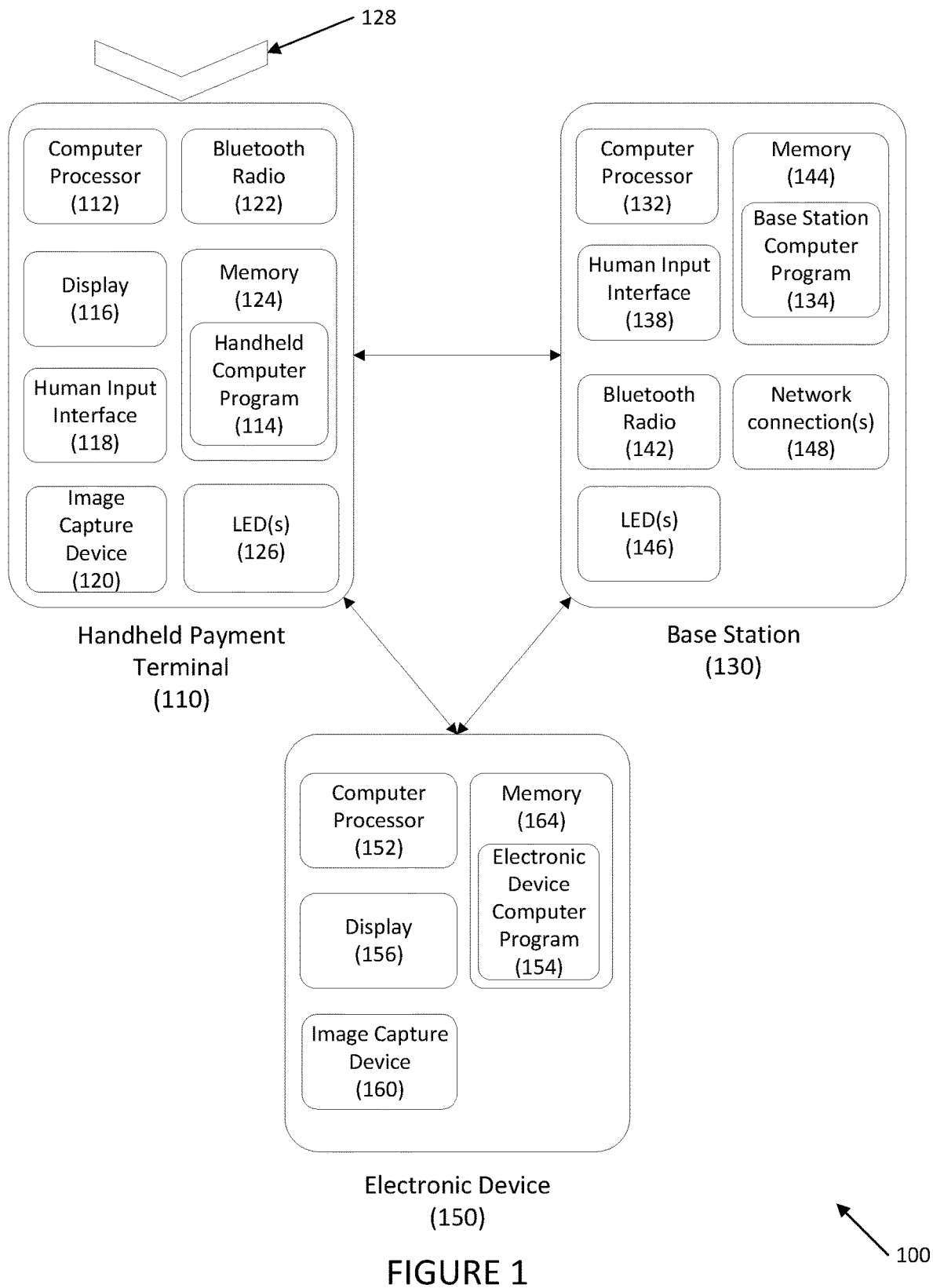
FIG. 1 depicts a system for Bluetooth numeric comparison pairing between a handheld payment terminal and a base station according to one embodiment.

Referring to FIG. 1, a system for pairing a handheld payment terminal and a base station is illustrated according to one embodiment. System 100 may include handheld payment terminal 110, base station 130, and electronic device 150. It should be recognized that the terms "handheld payment terminal" and "base station" are used for illustrative purposes only and the roles of these devices are not limiting.

Base station 130 may be any suitable device with which handheld payment terminal 110 may be paired. In one embodiment, base station 130 may provide charging functionality to handheld payment terminal 110, and may also provide network connections 148 (e.g., payment networks, WiFi, etc.) that may only be available to handheld payment terminal 110 via Bluetooth pairing. In addition, once paired, payment terminal 110 and base station 130 may exchange data.

In one embodiment, base station 130 may removably receive handheld payment terminal 110 in cradle 128 and may charge handheld payment terminal when so received.

In one embodiment, more than one handheld payment terminal 110 may be paired with base station 130. Similarly, handheld payment terminal 110 may be paired with one or more base station 130.

In one embodiment, base station 130 may include computer processor 132, base station computer program or application 134, human input interface 138, Bluetooth radio 142, memory 144, one or more LEDs 146, and network connection(s) 148.

In one embodiment, base station 130 may not have a display to display the digits of a numeric Bluetooth pairing code, and is therefore incapable of displaying the digits of the base station Bluetooth pairing code. Base station computer program or application 134 may be executed by computer processor 132 to generate a base station Bluetooth pairing code in accordance with the Bluetooth Specification, and may encode the base station Bluetooth pairing code into a coded light sequence (e.g., a sequence of LED "flashes") that is outputted using LED(s) 146. In one embodiment, base station computer program or application 134 may use one or more coding schemes (not shown) to encode the Bluetooth pairing code into the coded light sequence.

In one embodiment, the coding scheme may be preloaded in memory 144. In another embodiment, the coding scheme may be programmed into base station computer program or application 134, such as during installation, commissioning, and/or other initialization process. In still another embodiment, the coding scheme may be downloaded from a network location.

In one embodiment, handheld payment terminal 110, base station 130, and electronic device 150 are all provided with and use the same coding scheme.

Bluetooth radio 142 may receive and transmit signals in accordance with one or more Bluetooth standards, such as those detailed in the Bluetooth Specification.

In one embodiment, human input interface 138 may be a button, a keypad, etc. In one embodiment, human input interface 138 may receive an input from a human to initiate pairing, and may also receive an input (e.g., short press, long press, etc.) to indicate whether the handheld payment terminal's Bluetooth pairing code matches the base station's Bluetooth pairing code.

Memory 144 may store base station computer program or application 134 and may store one or more coding schemes (not shown) for encoding the Bluetooth pairing code into the coded light sequence.

LED 146 may be one or more LEDs capable of emitting the coded light sequence. For example, base station computer program 134 may instruct a controller associated with the LED 146 to emit the Bluetooth pairing code in coded light form in accordance with the coding scheme. In one embodiment, the computer processor 132 may control the LED 146 according to the instruction received from the base station computer program 134.

Handheld payment terminal 110 may be paired with base station 130 using Bluetooth numeric comparison. In one embodiment, handheld payment terminal 110 may include computer processor 112, handheld payment terminal computer program or application 114, display 116, human input interface 118, image capture device 120, Bluetooth radio 122, and memory 124. In one embodiment, handheld payment terminal may optionally include LED 126.

Human input interface 118 may be a keypad, a touchscreen, or any suitable device that may receive an input from a user.

In one embodiment, computer processor 112 may execute handheld payment terminal computer program or application 114 that may decode the coded light sequence captured by image capture device 120 to determine the base station Bluetooth pairing code. Computer program or application 114 may use a coding scheme (not shown) stored in memory 124 to decode the coded light sequence into the base station Bluetooth pairing code.

In one embodiment, the coding scheme may be provided to memory 124 by base station 130 when handheld payment terminal 110 is docked with base station 130. In another embodiment, the coding scheme may be downloaded to memory 124 from a network location. In still another embodiment, the coding scheme may be programmed in handheld payment terminal computer program or application 114, such as during installation, commissioning, and/or other initialization process.

Display 116 may display a handheld payment terminal Bluetooth pairing code that is generated by handheld payment terminal computer program or application 114 in accordance with the Bluetooth specification. It may also display the base station Bluetooth pairing code upon receipt.

Bluetooth radio 122 may receive and transmit signals in accordance with one or more Bluetooth standards, such as those detailed in the Bluetooth Specification.

Memory 124 may store handheld payment terminal computer program or application 114 as well as one or more coding schemes (not shown) for decoding the captured coded light sequence into a Bluetooth pairing code.

Handheld payment terminal 110 may optionally include one or more LEDs 126 to emit coded light representations of the handheld payment terminal Bluetooth pairing code as a second coded light sequence. It may be desirable to use a separate device, like electronic device 150, to assist in the pairing process if, for example, an added level of security is desired, the handheld payment terminal 110 lacks an image capture device 120, the image capture device 120 is not sophisticated enough to accurately capture coded light sequences, and/or any other reason. Additionally, it may be desirable to use another device to capture, decode, and compare the Bluetooth pairing codes of the handheld payment terminal 110 and the base station 130 for any other reason. In these or other types of instances, handheld payment terminal 110 may encode the handheld payment terminal Bluetooth pairing code into a coded light sequence and transmit the coded light sequence to another device, such as the electronic device 150.

Accordingly, system 100 may further include electronic device 150 that may include computer processor 152, electronic device computer program or application 154, display 156, image capture device 160, and memory 164. The image capture device 160 of the electronic device 150 is capable of accurately capturing a coded light sequence with sufficient processing power, sufficient shutter speed, sufficient frame rate, and any other requirements of an image capturing device that may not necessarily be available in the image capture device 120 of the handheld payment terminal 110. Electronic device computer program 154 may capture the coded light sequence from LED(s) 146 and decode the coded light sequence to determine the base station Bluetooth pairing code, and may cause the base station Bluetooth pairing code to be displayed on display 156.

Electronic device computer program 154 may also receive the handheld payment terminal Bluetooth pairing code from handheld payment terminal 110, and may compare the base station Bluetooth pairing code and receive the handheld payment terminal Bluetooth pairing code. Electronic device computer program 154 may then cause display 156 to display an instruction for the user to that the codes matched or did not match using human input interface 138 on base station 130, and using human input interface 118 on handheld payment terminal 110.

Electronic device 150 may be any suitable electronic device, including smartphones, portable computers (e.g., tablet computers, notebook computers, laptop computers, etc.), Internet of Things (IoT) appliances, etc.

In one embodiment, computer processor 152 may execute electronic device computer program or application 154 that may decode the coded light sequence detected by image capture device 160 to determine a base station Bluetooth pairing code using coding scheme (not shown) that may be stored in memory 164.

In one embodiment, the coding scheme may be downloaded to memory 164 from a network location. In another embodiment, the coding scheme may be programmed in electronic device computer program or application 154, such as during installation, commissioning, and/or other initialization process.

Memory 164 may store electronic device computer program or application 154 as well as one or more coding schemes (not shown) for decoding the captured coded light sequence.

Electronic device computer program or application 154 may cause display 156 to display the base station Bluetooth pairing code.

Figure 2:
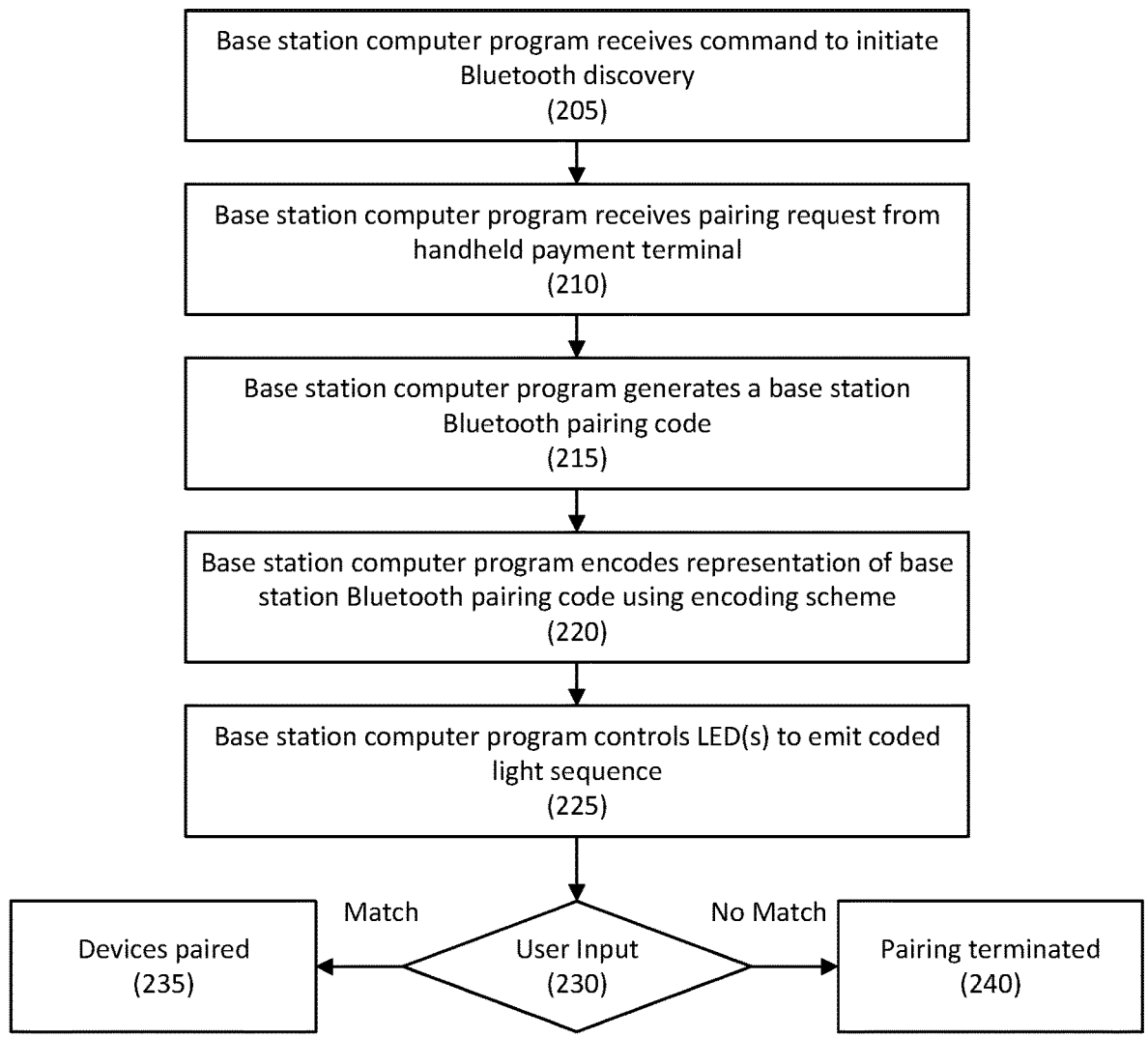
FIG. 2 depicts a method for Bluetooth numeric comparison pairing between a handheld payment terminal and a base station using the base station according to an embodiment.

Referring to FIG. 2, a method performed by the base station computer program 134 for Bluetooth numeric comparison pairing a handheld payment terminal and a base station is illustrated according to one embodiment.

In step 205, the base station computer program 134 receives a command to initiate Bluetooth discovery at a base station. In one embodiment, the user may press a button or similar input on the base station that instructs the base station to enter discovery mode; in another embodiment, the base station computer program 134 may remotely receive the input to instruct initiation of discovery mode via an application, a web interface, etc. The base station may enter discovery mode in accordance with the Bluetooth Specification.

In step 210, the base station computer program 134 may receive a pairing request from a handheld payment terminal via the Bluetooth radio.

In step 215, the base station computer program 134 generates a base station Bluetooth pairing code in accordance with the Bluetooth Specification in response to receiving the pairing request.

In step 220, the base station computer program 134 encodes the Bluetooth pairing code using, for example a coding scheme that may be stored in memory. While the Bluetooth pairing code may be in a base 10 form, the base station computer program 134 may convert the code to another base, such as binary, decimal, hexadecimal, etc., to facilitate encoding operations as will be discussed.

In one embodiment, the encoded representation may include a start sequence that may represent a unique value that cannot be included in the representation of the Bluetooth pairing code. An example of a suitable start sequence is "011110". A "0" is included at the beginning and the end of the start sequence to ensure its uniqueness from the bits representing the representation of the Bluetooth pairing code. The start sequence is used to indicate that the bits following the starting code are the representation of the Bluetooth pairing code.

For example, a six-digit Bluetooth pairing code has a value of between 000000 and 999999, which may be represented by 20 binary bits. Because it is possible for the four "1"s in the start sequence (011110) to also appear in the binary string, to prevent confusion with the start sequence as a result from these special patterns, the coding scheme defines a placeholder bit such as "0," that may be inserted before the last "1" in each occurrence of four "1"s (i.e., 1111) in the binary string. Thus, a "1111" becomes "11101," preventing the encoded binary representation of the Bluetooth pairing code to include four sequential "1" s.

Illustrative examples of Bluetooth pairing codes and their corresponding binary strings are provided below.

Bluetooth pairing code "219693" has a binary representation of "00110101101000101101." Because the start sequence (e.g., "011110") does not occur in the binary representation, the binary string, with the start sequence ("011110"), is "01111000110101101000101101."

Bluetooth pairing code "519926" has a binary representation of "01111110111011110110." Because the start sequence ("011110") occurs in the binary representation twice, the "1111" are replaced with "11101." Thus, the binary string, with the start sequence ("011110"), is "011110 0111111011101110110111010110" (note that the added "0"s are underlined).

The coding scheme used above, including the start sequence, is exemplary only and it should be recognized that other coding schemes, start sequences, etc. may be used as is necessary and/or desired.

In another embodiment, each digit in the Bluetooth pairing code may be represented by four bits, and the bits may be concatenated into a representation for the Bluetooth pairing code. Thus, Bluetooth pairing code "219693" may have a binary representation of 001000011001011010010011 (concatenated values 0010 0001 1001 0110 1001 0011). Similarly, Bluetooth pairing code "462039" may have a representation of 010001100010000000111001 (concatenated values 0100 0110 0010 0000 0011 1001). Any suitable starting sequence may be used as is necessary and/or desired.

In step 225, the base station computer program 134 may control one or more LEDs at the base station to emit coded light based on the encoded base station Bluetooth pairing code. The number of LEDs used may be selected as is necessary and/or desired. For example, a bit "1" in the encoded representation turns the LED on for a defined period of time, while a bit "0" in the encoded representation leaves the LED off for a defined period of time. In one embodiment, the on and off period for the LED may vary depending on the frame rate of the image capture device. For example, a "1" may be represented by the light being on for 200 ms, and a "0" may be represented by the light being off for 200 ms.

In another embodiment, the base station computer program may instruct the LED(s) to flash a set number of times and/or at a frequency that corresponds to the Bluetooth pairing code. Additionally, the base station computer program may instruct the LED to flash in a manner where each digit of the Bluetooth pairing code is serially transmitted. For instance, if the Bluetooth pairing code is "123456" then the base station computer program may first flash a start code, flash a number of times equaling the first digit (i.e. "1"), then a placeholder code, flash a number of times equaling the second digit (i.e. "2"), and so on until each digit of the Bluetooth pairing code is transmitted via the coded light. The start code and placeholder code may be predefined coded light sequences comprising a combination of flashes at a known frequency.

On one embodiment, a time spacing may be included between each flash or no flash. Any suitable time spacing may be used as is necessary and/or desired.

The base station computer program 134 may repeat controlling the LED(s) to emit the coded light sequence (e.g., start sequence followed by representation) for a pre-determined number of times, until the base station computer program receives an input from its human input interface (e.g., a button or similar), until the handheld payment terminal and the base station are paired, for a predetermined period of time, etc.

In step 230, the base station computer program 134 may receive an input from its human input interface, such as a button, that indicates that the base station Bluetooth pairing code matches the handheld payment terminal pairing code. For example, the human input interface may receive a short press (e.g., less than 1 second) indicating a match, or it may receive a long press long press (e.g., greater than 1 second) on the base station's human input interface. Any other suitable schemes, timings, etc. may be used as is necessary and/or desired.

If the input indicates a match, in step 235, the base station computer program 134 instructs the base station to continue pairing with the handheld payment terminal in accordance with the Bluetooth Specification.

If the input does not indicate a match, in step 240, the base station computer program 134 terminates the pairing process with the handheld payment terminal. The process may be repeated as is necessary and/or desired.

Figure 3:
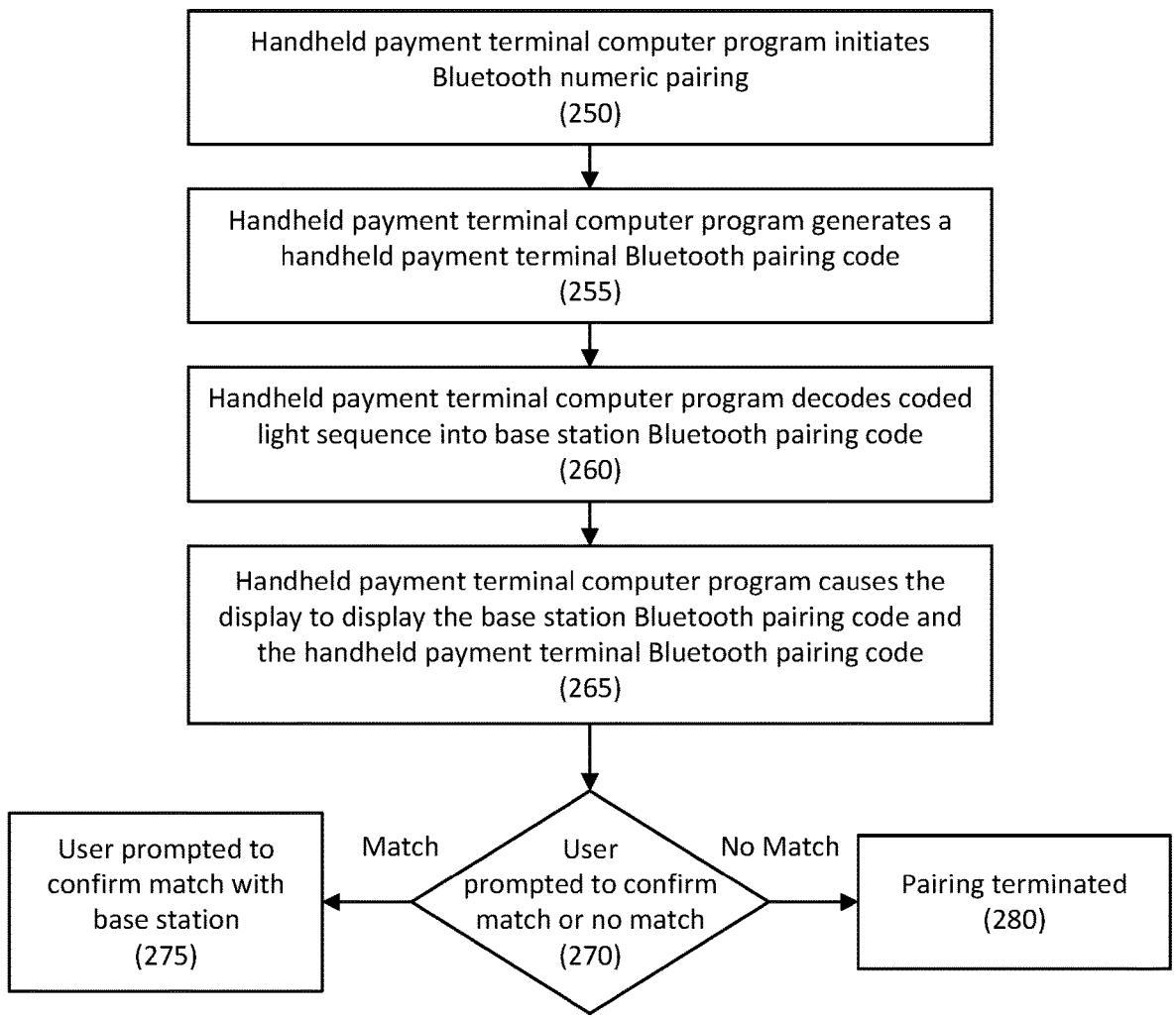
FIG. 3 depicts a method for Bluetooth numeric comparison pairing between a handheld payment terminal and a base station using the handheld payment terminal according to an embodiment.

Referring to FIG. 3, a method implemented by the handheld payment terminal computer program 114 for Bluetooth numeric comparison pairing a handheld payment terminal with a base station is illustrated according to one embodiment.

In step 250, the handheld payment terminal computer program 114 receives a command to initiate Bluetooth pairing with a base station. In one embodiment, the user may press a button or similar input on the handheld payment terminal that instructs the handheld payment terminal to enter discovery mode. For example, the handheld payment terminal computer program 114 may receive a command to enter into pairing mode, and the handheld payment terminal computer program may then initiate Bluetooth pairing with the base station by communicating a pairing request to the base station in accordance with the Bluetooth Specification.

In step 255, the handheld payment terminal computer program 114 may generate a handheld payment terminal Bluetooth pairing code in accordance with the Bluetooth Specification.

In step 260, the handheld payment terminal computer program 114 may receive a coded light sequence from one or more LEDs on the base station using the handheld payment terminal's image capture device. For example, the user may position the handheld payment terminal's image capture device to receive the coded light sequence from the LED(s) on the base station. The handheld payment terminal computer program 114 may then decode the coded light sequence to determine the base station Bluetooth pairing code.

In one embodiment, using the coding scheme, the handheld payment terminal computer program 114 may detect the start sequence (e.g., 011110) in the received coded light sequence. In one embodiment, the handheld payment terminal computer program 114 may review and analyze the coded light sequence according to a previously received coding scheme until the start sequence is identified. Once the start sequence is detected, using the coding scheme, the handheld payment terminal computer program 114 may decode the encoded binary representation to determine the base station Bluetooth pairing code. For example, using the coding scheme described above, the handheld payment terminal computer program may detect pattern 11101 in the encoded binary representation (which includes a "0" that was inserted by base station computer program 134 in order to avoid confusion with the start sequence "011110"), and may replace it with "1111". This results in the original binary representation of the base station Bluetooth pairing code.

In one embodiment, once the handheld payment terminal computer program has 20 bits of data (with the removal of any inserted "0" s), which is the number of bits used to represent the base station Bluetooth pairing code as a binary number, the handheld payment terminal computer program 114 may covert the binary representation of the base station Bluetooth pairing code to its base 10 equivalent of the base station Bluetooth pairing code.

According to another embodiment, if the coding scheme has each digit in the binary representation of the 6-digit base station Bluetooth pairing code represented by four bits, after the handheld payment terminal computer program 114 identifies the start sequence, it may decode each group of four bits into a base 10 number, and may concatenate the six numbers into the base station Bluetooth pairing code.

In step 265, the handheld payment terminal computer program 114 may cause the base station Bluetooth pairing code to be displayed on its display with the handheld payment terminal Bluetooth pairing code that it generated in step 255.

In step 270, the handheld payment terminal computer program 114 may cause the display to prompt the user to confirm that the base station Bluetooth pairing code matches the handheld payment terminal Bluetooth pairing code that was generated by the handheld payment terminal computer program. The user may respond to the prompt via the human input interface on the handheld payment terminal.

In one embodiment, because the handheld payment terminal computer program 114 knows the handheld payment terminal Bluetooth pairing code and the base station Bluetooth pairing code, the handheld payment terminal computer program 114 may confirm that the codes match or do not match without user input.

If the user confirms that the codes match, in step 275, the handheld payment terminal computer program 114 may cause the display to prompt the user to confirm the match using the base station's human input interface.

If the user confirms that the codes do not match, in step 280, the handheld payment terminal and the base station are not paired.

Figure 4:
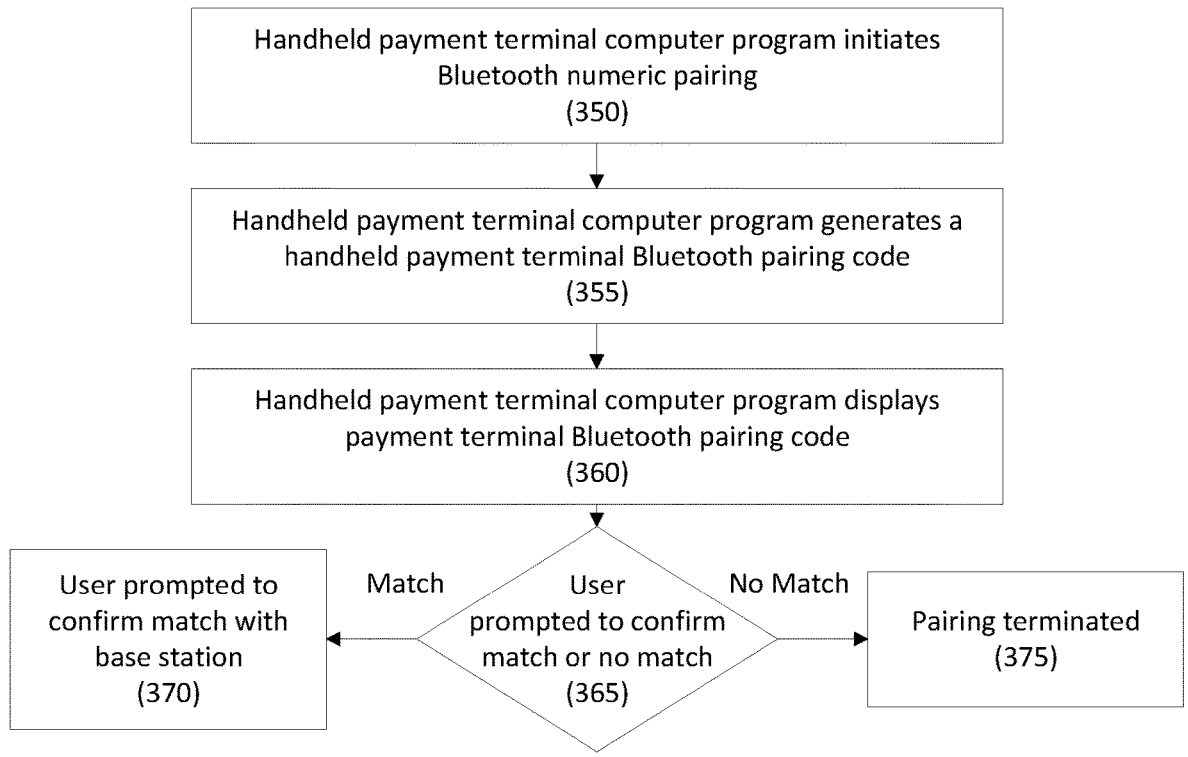
FIG. 4 depicts a method for Bluetooth numeric comparison pairing between a handheld payment terminal and a base station using an electronic device according to an embodiment.

FIG. 4 depicts a method for Bluetooth numeric comparison pairing a handheld payment terminal with a base station using an electronic device. For example, the handheld payment terminal may not include an image capture device, may not execute a computer program or application to decode the coded light sequence emitted by the base station LED(s), may not include a display to display the handheld payment terminal Bluetooth pairing code, or the user may otherwise desire to use an electronic device other than the handheld payment terminal to decode the coded light sequence emitted by the base station LED(s) into the base station Bluetooth pairing code. Thus, a separate electronic device may execute electronic device computer program 154 to capture a coded light sequence emitted by the base station LED(s) and determine the base station Bluetooth pairing code. Electronic device computer program 154 may also capture a coded light sequence emitted by the handheld payment terminal LED(s) and determine the handheld payment terminal Bluetooth pairing code. FIG. 4 illustrates the operation of the handheld payment terminal computer program 114 when a separate electronic device is used to facilitate the Bluetooth pairing of the handled payment terminal 110 and the base station 130.

In step 350, the handheld payment terminal computer program 114 receives a command to initiate Bluetooth pairing with a base station. This may be similar to step 250, above.

In step 355, the handheld payment terminal computer program 114 may generate a handheld payment terminal Bluetooth pairing code in accordance with the Bluetooth Specification. This may be similar to step 255, above.

In step 360, the handheld payment terminal computer program 114 may cause the handheld payment terminal Bluetooth pairing code that it generated in step 355 to be displayed In step 365, the handheld payment terminal computer program 114 may optionally cause the display of the handheld payment terminal to prompt the user to confirm that the base station Bluetooth pairing code matches the handheld payment terminal Bluetooth pairing code that was generated by the handheld payment terminal computer program 114. The user may respond to the prompt on the handheld payment terminal.

In another embodiment, the handheld payment terminal computer program 114 may communicate the handheld payment terminal Bluetooth pairing code to the electronic device using, for example, WiFi, NFC, Bluetooth, or any other suitable communication channel.

In another embodiment, the handheld payment terminal computer program 114 may emit the handheld payment terminal Bluetooth pairing code as a coded light sequence in the same manner that the base station emitted the base station Bluetooth pairing code as a coded light sequence.

If the user confirms that the codes match, in step 370, the handheld payment terminal computer program 114 may cause the display to prompt the user to confirm the match using the base station's human input interface.

If the user confirms that the codes do not match, in step 375, the handheld payment terminal and the base station are not paired.

Figure 5:
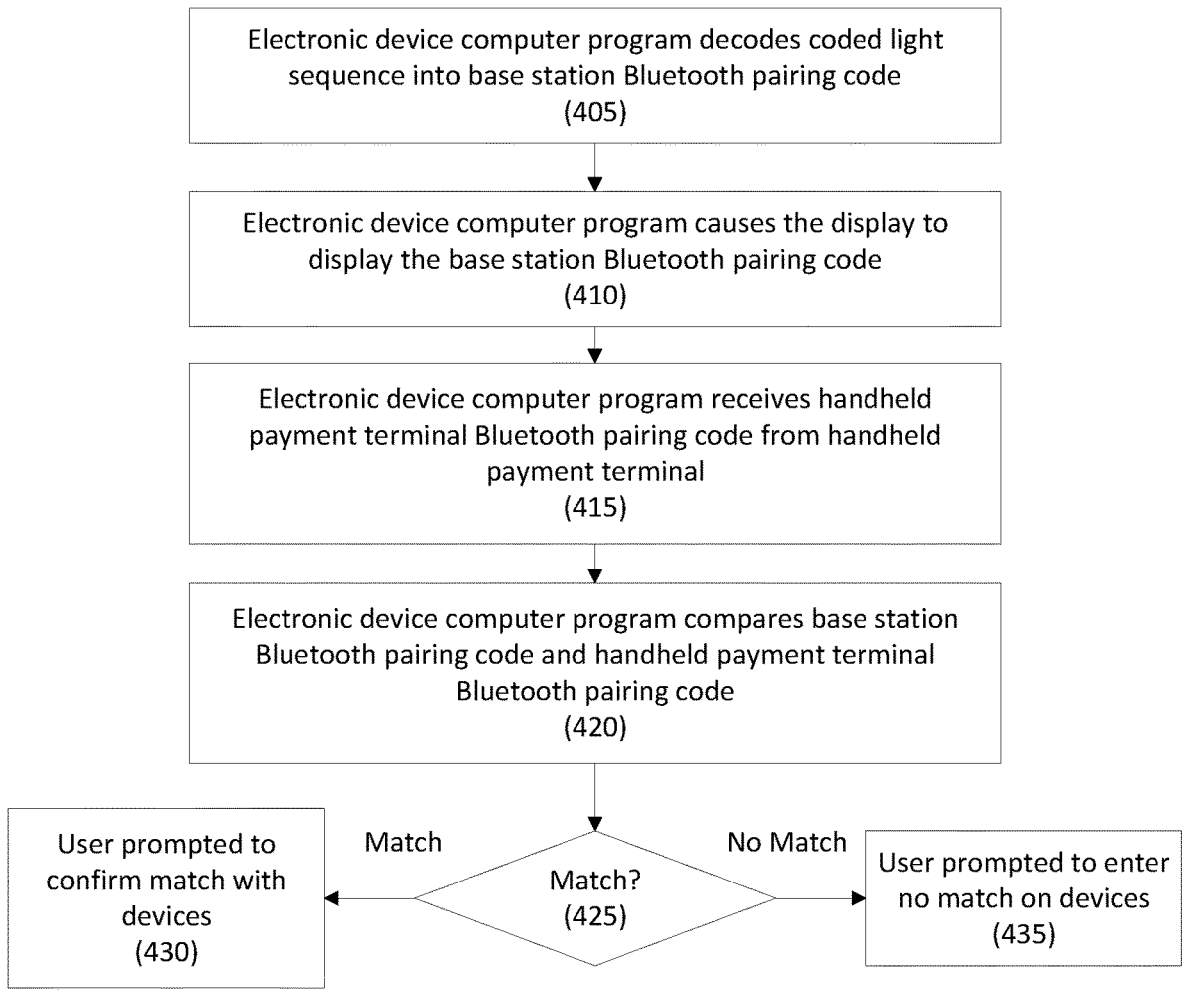
FIG. 5 depicts a method for Bluetooth numeric comparison pairing between a handheld payment terminal and a base station using the handheld payment terminal according to another embodiment.

Referring to FIG. 5, the operation of an electronic device computer program 154 implemented on the electronic device 150 is illustrated. In one embodiment, the electronic device 150 may be any suitable electronic device having an image capture device, including smartphones, portable computers (e.g., tablet computers, notebook computers, laptop computers, etc.), Internet of Things (IoT) appliances, etc. As discussed above with reference to FIG. 4, a separate electronic device, i.e. electronic device 150, may be used to facilitate pairing the handheld payment terminal 110 with the base station 130.

In step 410, the electronic device computer program 154 may cause the base station Bluetooth pairing code to be displayed on its display.

In step 415, the electronic device computer program 154 may receive the handheld payment terminal Bluetooth pairing code. In one embodiment, the electronic device computer program 154 may receive the handheld payment terminal Bluetooth pairing code as a coded light sequence as discussed above. For example, the handheld payment terminal payment program 114 may control one or more LEDs to emit a coded light sequence for the handheld payment terminal Bluetooth pairing code, and the electronic device computer program 154 may capture the coded light sequence from the handheld payment terminal, decode the coded light sequence into a binary representation of the handheld payment terminal Bluetooth pairing code, and convert the binary representation of the handheld payment terminal Bluetooth pairing code into a base 10 number that is the handheld payment terminal Bluetooth pairing code.

In another embodiment, the electronic device computer program 154 may receive the handheld payment terminal Bluetooth pairing code by capturing an image of the handheld payment terminal Bluetooth pairing code displayed by the handheld payment terminal. In another embodiment, the electronic device computer program may receive the handheld payment terminal Bluetooth pairing code by WiFi, NFC, Bluetooth, etc. In still another embodiment, the handheld payment terminal Bluetooth pairing code may be manually entered into the electronic device.

In step 420, the electronic device computer program 154 may compare the base station Bluetooth pairing code and the handheld payment terminal Bluetooth pairing code. If, in step 425, the Bluetooth pairing codes match, in step 430, the electronic device computer program may cause the display to prompt the user to confirm the match on both the handheld payment terminal and the base station using their respective human input interfaces. The handheld payment terminal and the base station are then paired.

If the codes do not match, in step 435, the electronic device computer program 154 may cause the display to prompt the user to confirm that the codes not match on one or both of the handheld payment terminal and the base station using their respective human input interfaces.

It will be appreciated by persons skilled in the art that the present invention is not limited by what has been particularly shown and described hereinabove. Rather, the scope of the present invention includes both combinations and subcombinations of features described hereinabove and variations and modifications thereof which are not in the prior art. It should further be recognized that these embodiments are not exclusive to each other.

It will be readily understood by those persons skilled in the art that the embodiments disclosed here are susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A system for Bluetooth numeric comparison pairing a handheld payment terminal with a base station using an electronic device, the system comprising:
   the base station configured to:
      receive a request to initiate Bluetooth numeric pairing with a handheld payment terminal using a Bluetooth radio;
      generate a base station Bluetooth pairing code, wherein the base station is incapable of displaying digits of a base station Bluetooth pairing code;
      encode the base station Bluetooth pairing code according to a coding scheme;
      cause one or more light emitting diodes (LEDs) on the base station to emit the encoded base station Bluetooth pairing code as a coded light sequence;
      receive, from a human input interface, an indication that the base station Bluetooth pairing code matches a handheld payment terminal Bluetooth pairing code;
      in response to the indication, pair with the handheld payment terminal; and
      provide, via the Bluetooth radio, a network connection to the handheld payment terminal using at least one network connection when paired;
   the handheld payment terminal configured to:
      initiate Bluetooth numeric pairing with a base station using a Bluetooth radio on the handheld payment terminal;
      generate a handheld payment terminal Bluetooth pairing code;
      cause the handheld payment terminal Bluetooth pairing code to be displayed on a display of the handheld payment terminal; and
      pair with the base station; and
   the electronic device configured to:
      capture the coded light sequence from the one or more LEDs on the base station using an electronic device image capture device;
      decode the coded light sequence to determine the base station Bluetooth pairing code;
      receive the handheld payment terminal Bluetooth pairing code from the handheld payment terminal;
      compare the base station Bluetooth pairing code and the handheld payment terminal Bluetooth pairing code;
      cause the display of the electronic device to display a result of the comparison; and
      cause the display of the electronic device to display a prompt to enter a match or no match on the base station and/or the handheld payment terminal.

2. The system of claim 1, wherein the coded light sequence comprises an encoded representation of the base station Bluetooth pairing code.

3. The system of claim 1, wherein the electronic device receives the handheld payment terminal Bluetooth pairing code from the handheld payment terminal by capturing a second coded light sequence from one or more LEDs on the handheld payment terminal using the electronic device image capture device and decoding the second coded light sequence to determine the handheld payment terminal Bluetooth pairing code.

4. The system of claim 1, wherein handheld payment terminal is further configured to cause digits of the handheld payment terminal Bluetooth pairing code to be displayed on the display of the handheld payment terminal.

5. The system of claim 4, wherein the electronic device receives the handheld payment terminal Bluetooth pairing code from the handheld payment terminal by receiving an image comprising the digits of the handheld payment terminal Bluetooth pairing code displayed on the display of the handheld payment terminal captured using the electronic device image capture device.

6. The system of claim 1, wherein the network connection comprises a network connection to a payment network.

* * * * *